219-121 SR
5/5/87 OR 4,663,515

United States Patent [19]

Kneeland et al.

[11] Patent Number: 4,663,515

[45] Date of Patent: May 5, 1987

[54] PLASMA-ARC TORCH INTERLOCK WITH FLOW SENSING

[75] Inventors: Robert D. Kneeland, Enfield; Bruce O. Hatch, Lebanon; Richard A. Spaulding, Hanover, all of N.H.

[73] Assignee: Thermal Dynamics Corporation, West Lebanon, N.H.

[21] Appl. No.: 794,389

[22] Filed: Nov. 4, 1985

[51] Int. Cl.[4] .............................................. B23K 15/00

[52] U.S. Cl. ........................ 219/121 PT; 219/121 PU; 219/121 PC

[58] Field of Search ......... 219/74, 75, 121 P, 121 PU, 219/121 PV, 121 PT, 121 PW, 124.02, 124.03, 130.21

[56] References Cited

U.S. PATENT DOCUMENTS

| | | | |
|---|---|---|---|
| 3,558,973 | 1/1971 | Pochert et al. | 315/111 |
| 4,035,603 | 7/1977 | Fernicola | 219/121 PT |
| 4,339,700 | 5/1982 | Jagieniak et al. | 219/121 |

FOREIGN PATENT DOCUMENTS

| | | |
|---|---|---|
| 0081106 | 6/1983 | European Pat. Off. . |

*Primary Examiner*—M. H. Paschall

*Attorney, Agent, or Firm*—Majestic, Gallagher, Parsons & Siebert

[57] ABSTRACT

A plasma-art torch interlock with flow sensing is provided. A flow rate sensor is included within the conduit supplying working fluid to a plasma-arc torch. By sensing an increase in flow rate of the working fluid which is caused by a necessary part being not in place, a control circuit shuts off power to the torch. Pressure in the conduit may also be sensed and the power to the torch shut down if a minimum pressure needed for torch operation is not achieved. In a second embodiment, two conduits are provided to supply fluid to the torch. One conduit supplies the primary working fluid to create the plasma-arc while the other supplies secondary flow for purposes of cooling.

10 Claims, 4 Drawing Figures

PLASMA-ARC TORCH INTERLOCK WITH FLOW SENSING

BACKGROUND OF THE INVENTION

1. Field of the Invention

This invention is directed to an interlock for preventing the operation of a plasma-arc cutting system when necessary parts are not in place. It relates specifically to such an interlock system which senses flow rate in lines supplying working fluid such as gas to a plasma-arc torch which shuts off power to the torch when a necessary part is missing, as indicated by an increase in flow rate to a level above a predetermined amount.

2. Description of the Prior Art

Plasma-arc torches find wide application to tasks such as cutting, welding and spray bonding. These torches operate by directing a plasma consisting of ionized gas particles toward a workpiece.

In the operation of a typical plasma torch, such as illustrated in U.S. Pat. Nos. 4,324,971; 4,170,727; and 3,813,510 assigned to the same assignee as the present invention, a gas to be ionized is supplied to the front end of the torch in front of a negatively-charged electrode. The torch tip which is adjacent to the end of the electrode, at the front end of the torch, has a sufficiently high voltage applied thereto to cause a spark to jump between the electrode and the torch tip thereby heating the gas and causing it to ionize. A pilot DC voltage between the electrode and the torch tip maintains an arc known as the pilot, or non-transferred arc. The ionized gas in the gap appears as a flame and extends externally off the tip where it can be seen by the operator. As the torch head or front end is brought down towards the workpiece, the arc jumps from the electrode to the workpiece since that impedance of the workpiece current path is lower then the impedance of the torch tip current path.

The ionized gas or working fluid is supplied through a conduit from a source of fluid pressure to the torch tip. Frequently, a secondary flow of fluid is provided which passes through a separate flow path from the first mentioned working fluid for purposes of cooling various torch parts. In this case, the first mentioned fluid is called the primary fluid or gas and the second is called the secondary fluid.

Because the electrode and tip operate in a very high temperature environment, they must be replaced from time to time as they are used up. Accordingly, torches are designed to facilitate periodic replacement of these electrodes and tips.

Sometimes, because of operator carelessness perhaps, a tip, electrode or other essential torch part is left off the torch during replacement and not present when the torch is operated. This may cause operator injury. At the very least it can cause damage to the torch. For example, if the tip is not in place the arc generated from the electrode may strike and damage another part of the torch.

The assignee's own U.S. Pat. No. 4,585,921 issued Apr. 29, 1986, entitled "Torch Operation Interlock Device" describes an electrical circuit means that functions as an operation interlock when torch parts are not in place. If a sensed part is not in place, the control circuit functions to interrupt operation of the torch, thereby minimizing operator injury and torch damage.

While a satisfactory solution to the torch parts in place problem, applicant's assignee's prior art device does require a more complex electrical circuit. A current path must be established through the part or parts to be retained. This requires at least one additional wire to form a circuit. Such a circuit thus adds to cost as well as to complexity.

SUMMARY AND OBJECTS OF THE INVENTION

Applicant's invention attempts to solve the parts in place problem by monitoring flow rate of the plasma arc torch working fluid. Where both primary and secondary fluids are present, the flow of only one of the fluids need be sensed. Applicant's operation interlock device functions to shut off power to the torch if the flow rate of the working fluid such as gas rises above a desired, predetermined level. The device also includes a pressure switch for sensing the presence of sufficient fluid pressure for satisfactory torch operation.

It is an object of this invention to provide a parts in place operation interlock device which senses fluid flow above a certain level and shuts off operation when it is exceeded.

It is a further object to provide such an interlock device which senses minimum desired pressure and shuts off power to the torch when the minimum is not achieved.

It is a further object to provide such an interlock device which is less complex, has fewer parts, and is therefore less costly to produce.

Further and other objects and advantages will become more apparent by having reference to the accompanying drawings and the following detailed description and claims.

DETAILED DESCRIPTION OF THE DRAWINGS

Figure 1:
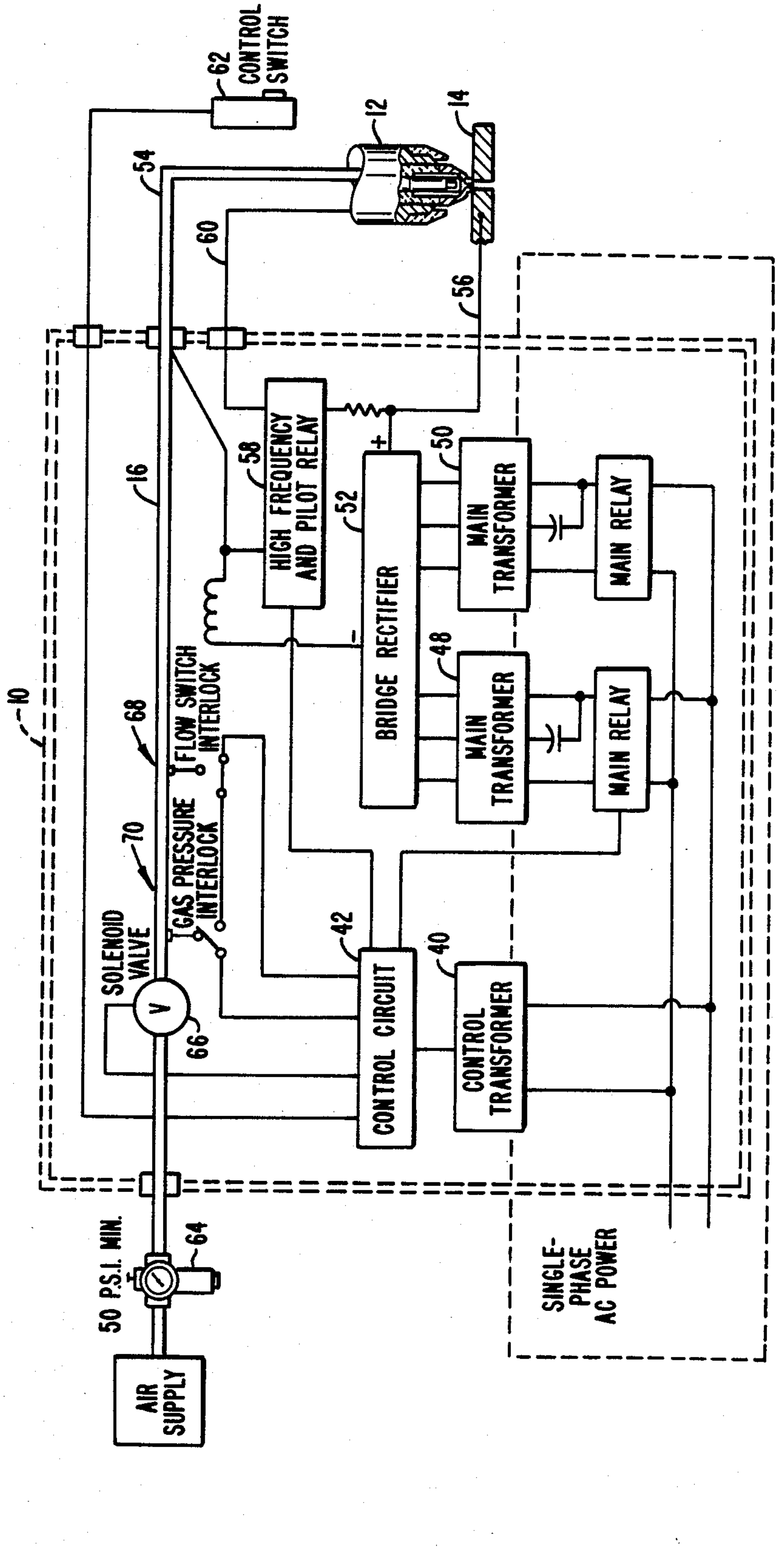
FIG. 1 is a schematic view of a plasma-arc torch circuit illustrating the operation interlock device connected to a torch head shown in cross-section.

FIG. 1 illustrates a plasma-arc torch circuit schematic. Double dotted lines denote the plasma-arc torch power supply and control unit 10. A torch 12 is positioned over a workpiece 14 such as a metal plate to be cut. Working fluid such as air is channeled from an air supply (not shown) by means of a conduit 16 which terminates in torch 12.

Figure 2:
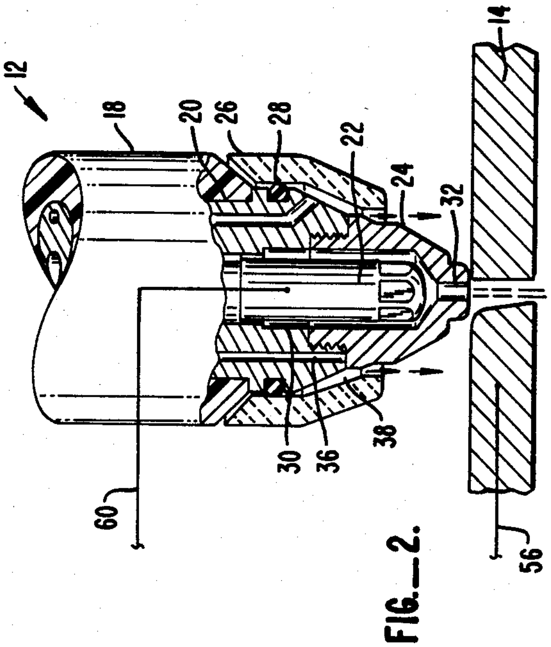
FIG. 2 is an enlarged cross-sectional schematic view of the torch head showing details thereof.
Figure 3:
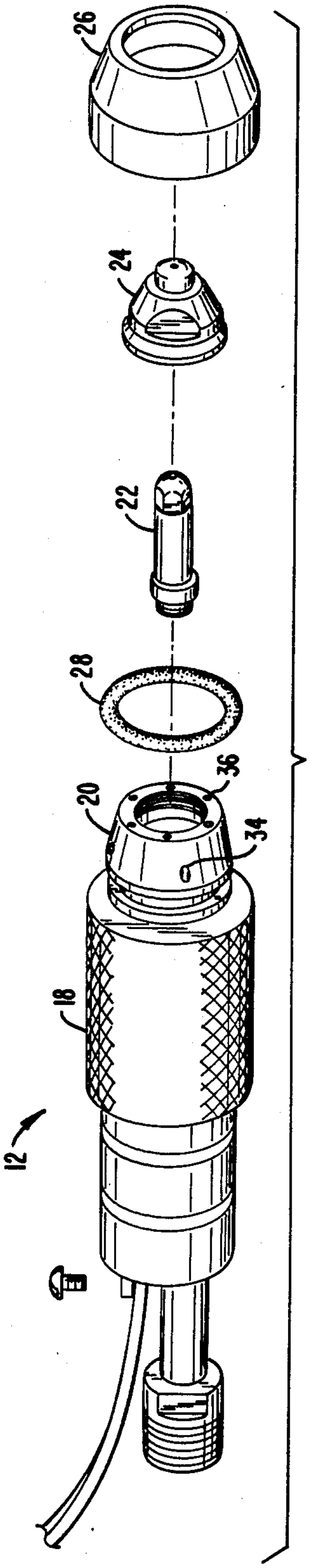
FIG. 3 is an exploded isometric view of a torch illustrating the orientation of its parts.

As may be best seen in FIGS. 2 and 3, the torch comprises a generally elongated body 18 having a gas distributor 20 at the forward end thereof. An elongated electrode 22 is centrally disposed and removably threadedly secured within the forward end of the torch. Surrounding the electrode 22 is a cup shaped tip 24. Tip 24 is similarly removably threadedly secured within the forward end of the torch.

Press fit onto the torch is a cup 26 of a non-conductive high temperature resistant material such as ceramic. An "O" ring seal 28 of resilient material provides a gas tight seal between the cup 26 and the torch.

With particular reference to FIG. 2, air flowing into torch 12 from the air supply source (not shown) splits into primary and secondary flows. Parenthetically, while air is used for the working fluid in the following discussion, such is merely for the sake of convenience. Other fluids such as nitrogen and carbon dioxide may be used and the discussion of air is not meant to be limiting in any way. The primary or plasma flow enters annular chamber 30 surrounding electrode 22 and exits through orifice 32 in tip 24. The secondary or cooling gas flow passes through gas distributor 20 through a first plurality of angled passages 34 in gas distributor 20. A second plurality of straight passages 36 is also contained in the gas distributor for a purpose which will be described hereinafter. Suffice it to say that this second plurality of passages also leads to the gas chamber source but its exit is blocked by the presence of tip 24. Angled passages 34 exit into a tapered annular chamber 38 defined by the interior of the cup 26 and the exterior of the gas distributor 20 and tip 24 for purposes of cooling these parts.

Returning to FIG. 1, the circuit is supplied with power from a source of single-phase AC power (not shown). Power is conveyed to a control transformer 40 for powering control circuits 42. AC power is also directed to a pair of main relays 44, 46. Power is then conveyed to a pair of main transformers 48, 50, respectively. The output of the main transformers 48, 50 is directed to bridge rectifier 52 which converts the AC power to DC power for the cutting arc.

The negative output of bridge rectifier 52 connects to the torch electrode through the torch lead 54. The positive output is connected to the workpiece 14 by means of a work cable 56. The negative output of bridge rectifier 52 also supplies a high frequency and pilot relay 58. Power is supplied from high frequency relay 58 through pilot lead 60 to the torch for establishing a pilot arc for starting under the command of control circuit 42. Manually operable control switch 62 located on the torch serves to operate the control circuit 42.

Air from the supply is first regulated to a desired pressure by means of a pressure regulator 64. It then passes through conduit 16 to torch 12 under the control of solenoid valve 66 which is controlled by control circuit 42. Downstream of solenoid valve 66, gas flow and pressure are separately sensed by a flow switch 68 and pressure switch 70, respectively. These switches feed their informatin to control circuit 42.

In operation, control switch 62 is manually actuated. The torch sequence then begins with the closing of high frequency relay 58 by control circuit 42 and a pilot arc is established between the torch electrode 22 and the tip 24 as best seen in FIG. 2. This arc creates a path for transferring the cutting arc to the work. Bridge rectifier 52 converts AC power to DC power for the cutting arc. Solenoid valve 66 is opened by control circuit 42, thereby admitting working fluid to torch 12.

Flow switch 68 is set to the maximum desired flow rate of gas. As seen in FIG. 2, the angled orifices are dimensioned to accept the desired gas flow rate for the plasma-arc operation at a pre-set desired gas pressure. If the flow rate increases beyond the desired value, the control circuit operates to open the main relays 44, 46 and thereby to shut off current to the torch. The straight passages are dimensioned so that their exposure due to the lack of the tip being in place will produce a gas flow above the desired value.

Pressure in conduit 16 is also monitored, and power to the torch is shut down if pressure is below a predetermined desired amount which is sufficient for proper torch operation. Again, the control circuit 42 operates to open relays 44, 46 and shut off current to the torch.

Figure 4:
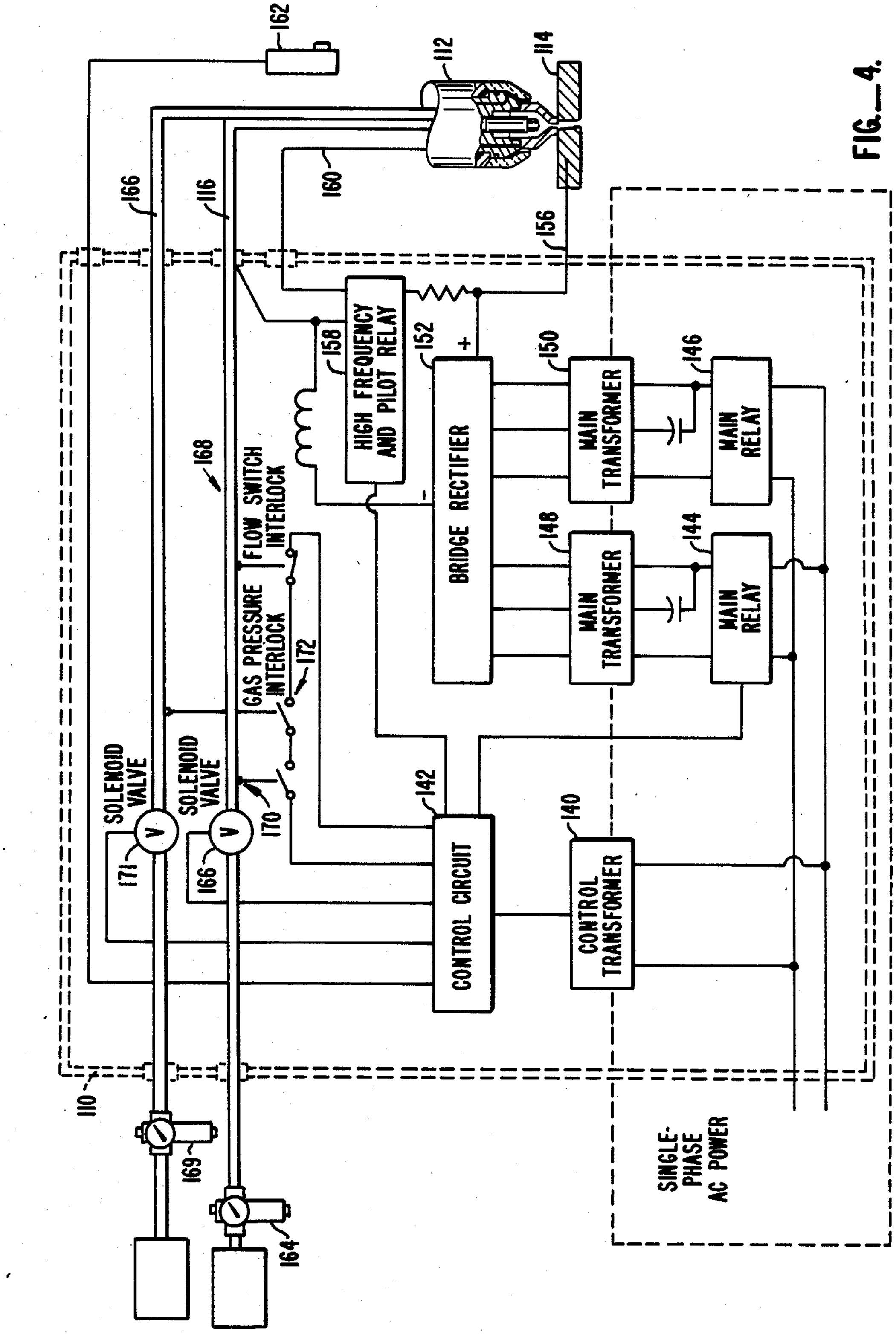
FIG. 4 is a schematic view of a plasma-arc circuit showing an alternate embodiment having primary and secondary fluid flows.

The second embodiment shown in FIG. 4 is similar to the above-described first embodiment except that primary and secondary gas are channeled through separate lines or conduits. This is necessary, for example, when it is desired to use different gases for the primary and secondary flows. For sake of convenience, structure having an analagous counterpart in the first embodiment device of FIG. 1 is preceded by the number one ("1").

As shown, an additional conduit 166 for primary flow is provided in parallel with the first conduit 116 which supplies secondary flow. A pressure regulator 168 controls pressure from a source of fluid pressure (not shown). A solenoid valve 171 which is controlled by control circuit 142 is placed downstream of regulator 169. A pressure switch 172 is also included to sense pressure in conduit 166. However, flow in conduit 166 is not sensed. Flow rate need only be sensed in the secondary conduit since that line feeds the passages within the tip. Of course, flow in the primary conduit could also be sensed. It would give a more gross indication, however.

It is to be understood that while the invention has been described above in conjunction with the preferred specific embodiment thereof, that the description is intended to illustrate and not limit the scope of the invention, which is defined by the scope of the appended claims.

We claim:

1. In a plasma-arc cutting system, a torch, a torch tip mounted on said torch, power supply means supplying power to said torch, a fluid source, conduit means for communicating said fluid source to said torch for delivery of fluid thereto for generating a plasma, means for sensing the absence of a part from said torch comprising flow sensing means associated with said conduit means for sensing flow rate in said conduit means, control means for shutting off power to said torch when said flow rate in said conduit means increases above a predetermined value, and pressure sensing means associated with said conduit means for sensing pressure in said conduit means, said control means further operating to shut off power to said torch if pressure in said conduit means drops below a predetermined value.

2. The invention of claim 1 wherein said flow sensing means is a flow switch, and wherein said pressure sensing means is a pressure switch.

3. The invention of claim 1 further including a second conduit means intercommunicating said fluid source with said torch whereby both primary and secondary fluids may be conveyed thereto.

4. The invention of claim 3 further including a second pressure sensing means associated with said second conduit means, and wherein said control means shuts off current to said torch when pressure in said second conduit means drops below a predetermined value.

5. The invention of claim 4 wherein said second pressure sensing means is a pressure switch.

6. In a plasma-arc cutting system, a torch, a power supply means for supplying power to said torch, a fluid source, conduit means for communicating said fluid source to said torch for delivery of fluid thereto for generating a plasma, a torch part removably mounted on said torch, said torch part being dimensioned and positioned so as to partially close off flow through said conduit means when said torch part is mounted on said torch and open up flow through said at least one conduit means when said torch part is not mounted on said torch, and flow sensing means for sensing flow rate in said conduit means, and a control means for shutting off power to said torch when the flow rate in said conduit means increases above a predetermined value.

7. The invention of claim 6 wherein said conduit means comprises a plurality of conduits in said torch, and wherein said torch part obturates at least one of said conduits when said torch part is mounted on said torch and wherein removal of said torch part causes an increase in flow rate above said predetermined value.

8. The invention of claim 7 whereing said torch comprises a generally elongated body defining a forward end, a fluid distributor mounted on said forward end, a cup-shaped tip mounted on said fluid distributor, and an annular shield cup mounted on said fluid distributor in spaced relation to said tip so as to define an annular space therebetween.

9. The invention of claim 8 wherein said conduits are located in said fluid distributor, and wherein some of said conduits are obturated when said tip is mounted on said gas distributor whereby the flow of fluid through said torch is reduced to a flow rate below said predetermined value when said tip is mounted in said fluid distributor.

10. The invention of claim 9 further including pressure sensing means associated with said conduit means, said control means further operating to shut off power to said torch if pressure in said conduit means drops below a predetermined value.

* * * * *